(12) United States Patent
Gummeson et al.

(10) Patent No.: US 10,331,916 B2
(45) Date of Patent: Jun. 25, 2019

(54) CONTROLLING DEVICES BASED ON COLLOCATION OF THE DEVICES ON A USER

(71) Applicant: HEWLETT-PACKARD DEVELOPMENT COMPANY, L.P., Houston, TX (US)

(72) Inventors: Jeremy Gummeson, Palo Alto, CA (US); Mary G Baker, Palo Alto, CA (US); Animesh Srivastava, Durham, NC (US); Shrirang Mare, Palo Alto, CA (US)

( * ) Notice: Subject to any disclaimer, the term of this patent is extended or adjusted under 35 U.S.C. 154(b) by 37 days.

(21) Appl. No.: 15/516,463

(22) PCT Filed: Nov. 15, 2014

(86) PCT No.: PCT/US2014/065847
§ 371 (c)(1),
(2) Date: Apr. 3, 2017

(87) PCT Pub. No.: WO2016/076894
PCT Pub. Date: May 19, 2016

(65) Prior Publication Data
US 2018/0239932 A1    Aug. 23, 2018

(51) Int. Cl.
*H04L 29/06*        (2006.01)
*H04W 4/02*         (2018.01)
(Continued)

(52) U.S. Cl.
CPC ............ *G06F 21/88* (2013.01); *H04L 63/107* (2013.01); *H04W 4/027* (2013.01); *H04W 8/005* (2013.01);
(Continued)

(58) Field of Classification Search
CPC ...... G06F 21/88; H04L 63/107; H04W 4/027; H04W 8/005; H04W 12/08
(Continued)

(56) References Cited

U.S. PATENT DOCUMENTS

2009/0023391 A1    1/2009 Falck
2009/0167486 A1    7/2009 Shah et al.
(Continued)

FOREIGN PATENT DOCUMENTS

WO    WO-2011066381 A2    6/2011
WO    WO-2012115625 A1    8/2012

OTHER PUBLICATIONS

Cory Cornelius et al, "Recognizing Whether Sensors are on the Same Body", Mar. 11, 2011.
(Continued)

*Primary Examiner* — Michael S McNally
(74) *Attorney, Agent, or Firm* — HPI Patent Department

(57) ABSTRACT

Examples included herein involve analyzing first movement data measured by a first accelerometer of the first device, analyzing second movement data measured by a second accelerometer of a second device, determining whether the first device and the second device are collocated on a same user based on the first movement data and the second movement data, and controlling a function of the first device or the second device based on whether the first device and the second device are collocated on the same user.

17 Claims, 10 Drawing Sheets

(51) Int. Cl.
*H04W 8/00* (2009.01)
*G06F 21/88* (2013.01)
*H04W 12/08* (2009.01)

(52) U.S. Cl.
CPC ..... *H04W 12/08* (2013.01); *G06F 2221/2111* (2013.01)

(58) Field of Classification Search
USPC .......................................................... 726/34
See application file for complete search history.

(56) References Cited

U.S. PATENT DOCUMENTS

| | | |
|---|---|---|
| 2009/0171180 A1 | 7/2009 | Pering et al. |
| 2013/0281164 A1 | 10/2013 | Alameh et al. |
| 2014/0032165 A1 | 1/2014 | Sarrafzadeh et al. |
| 2014/0106677 A1 | 4/2014 | Altman |
| 2014/0273849 A1* | 9/2014 | Lee ....................... G06F 1/1694 455/41.2 |
| 2014/0285416 A1 | 9/2014 | Priyantha et al. |
| 2014/0300490 A1 | 10/2014 | Kotz et al. |

OTHER PUBLICATIONS

Jonathan Lester et al, "Are You With Me?—Using Accelerometers to Determine if Two Devices are Carried by the Same Person", Feb. 9, 2004.
Kai Kunze et al, "Where Am I:, Recognizing On-Body Positions of Wearable Sensors", Aug. 12, 2006.
Holmquist L E et al: "Smart-Its Friends: A Technique for Users to Easily Establish Connections Between Smart Artefacts", Internet Citation.

* cited by examiner

CONTROLLING DEVICES BASED ON COLLOCATION OF THE DEVICES ON A USER

BACKGROUND

In recent years, it has become common for users to carry a plurality of computing devices. For example, a user may carry a mobile device (e.g., a cellular phone, a smartphone, a tablet, an mp3 player, a personal digital assistant (PDA), etc.), a wearable device (e.g., a smart watch, smart glasses, smart clothing, etc.), a laptop computer, a camera (or video recorder), or any other type of computing device. Accordingly, a user may perform a plurality of tasks (e.g., communicate with another user, access a network, play games, generate data, create documents, etc.) using any of the above devices.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
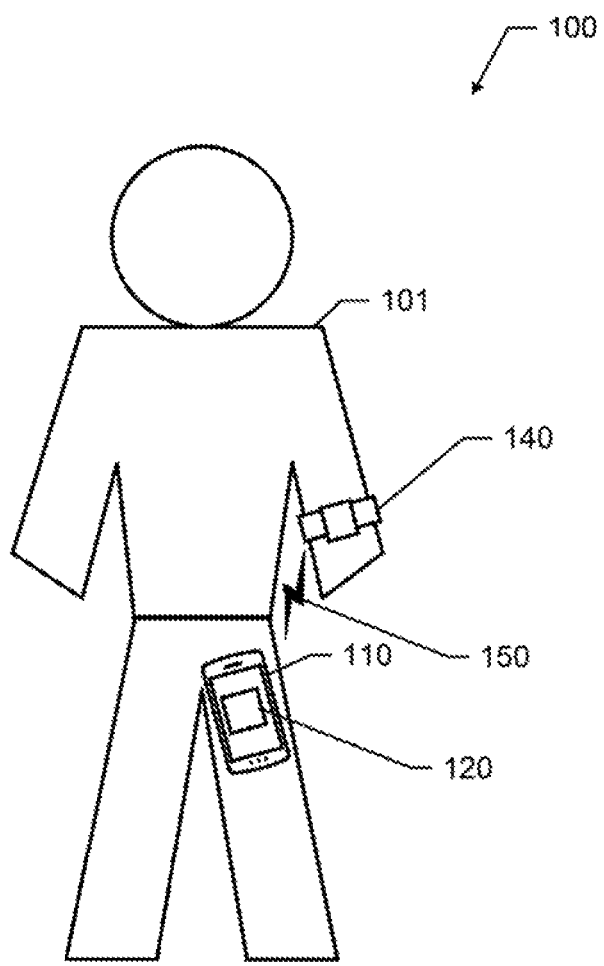
FIG. 1 illustrates an example environment of use in which a device including a collocation manager, constructed in accordance with an aspect of this disclosure, may be implemented.

Examples disclosed herein involve monitoring devices associated with a user to determine whether the devices are collocated on the user and controlling the devices based on whether the devices are collocated on the user. Examples disclosed herein involve comparing footstep patterns from movement data measured by the devices (e.g., using accelerometers or other similar sensors) to determine whether the devices are collocated on the user and controlling at least one of the devices based on the determination.

Many users have begun carrying multiple devices to meet the needs of their everyday life. Accordingly, it has become more and more cumbersome for these users to keep track of and secure these devices. Determining whether these devices are suddenly missing from a user's person and controlling the devices can provide enhanced safety and security of the devices. For example, a user may be notified (e.g., within seconds) that the user does not have one or more of the devices. In another example, a device may be locked after being separated from a user to avoid unauthorized users from accessing or using the device. Furthermore, notifications may be sent to third parties' or the user using an automated messaging system when the user becomes separated from a device.

An example method disclosed herein includes establishing a communicators link between a first device and a second device, analyzing first movement data measured by a first accelerometer of the first device, analyzing second movement data measured by a second accelerometer of a second device, determining whether the first device and the second device are collocated on a same user based on the first movement data and the second movement data, and controlling a function of the first device or the second device based on whether the first device and the second device are collocated on the same user. An example apparatus includes a collocation interface to identify a communication link established between a first device and a second device, a movement analyzer to compare first movement and second movement data, a collocation manager to determine whether a first device is collocated with a second device based on the first movement data and the second movement data, and a control manager to control the first device or send control instructions to the second device based on whether the first device is collocated with the second device.

As used herein collocated is defined as being physically located on or physically attached/connected to (whether directly or indirectly) a same user. For example, a device is collocated with another device on a user if the devices are considered to be on the user's person or in the user's physical possession. Devices may be on a user's person or in a user's physical possession when the device is directly held by the user (e.g., in the user's hand) or indirectly held by the user (e.g., by an object being held or worn by the user (e.g., in a purse, in a pocket of clothing, etc.)). As used herein, stating that any device, object, or part is in any way located on or with (e.g., positioned on or with, disposed on or with, or formed on or with, etc.) a person or object, means that the referenced device is either in contact with the person or object, or that the referenced device is in contact with at least one intermediate object located between the referenced device and the person or object.

FIG. 1 illustrates an example environment of use 100 for a user 101 in which a mobile device 110 including a collocation manager 120, constructed in accordance with an aspect of this disclosures, may be implemented. In the illustrated example of FIG. 1, the user 101 carries the mobile device 110 and a wearable device 140. The example user 101 may be any individual person or individual being having access or control over the mobile device 110 and wearable device 140. The mobile device 110 may communicate with the wearable device 140 via a communication link 150. In some examples, the user 101 may connect to a network (e.g., a cellular network, the Internet, etc.) via the mobile device 110 or the wearable device 140. In examples disclosed herein, the collocation manager 120 determines whether the mobile device 110 and the wearable device 140 are collocated on the user 101. Furthermore, in examples disclosed herein, the collocation analyzer 110 may control or cause control of the mobile device 110 or the wearable device 140 based on the determination of whether the mobile device 110 and the wearable device are collocated on the user.

In the illustrated example of FIG. 1, the mobile device 110 may be located in a pocket (not shown) of the user 101. The mobile device 110 of FIG. 1 may be a smartphone, mp3 player, PDA, etc. In some examples, the mobile device 110 of FIG. 1 may be held in a hand of the user 101 or in a bag or other apparatus to hold the mobile device 110. Accordingly, in FIG. 1, the mobile device 110 is located on (collocated with) the user 101. Additionally, in the illustrated example of FIG. 1, the wearable device 140 is located on a wrist of the user 101. The example wearable device 110 of FIG. 1 may be a smartwatch or smart bracelet. In other examples, the wearable device 140 may be another mobile device similar to the mobile device 110 or a device located elsewhere on the user 101. Accordingly, in FIG. 1, the wearable device 140 is located on the user 101. In some examples, the mobile devise 110 or the wearable device 140 may not be located on the user 101. In such examples, the mobile device or wearable device 140 may be controlled in accordance with the teachings of this disclosure.

In FIG. 1, the mobile device 110 may communicate with the wearable device 140 via the communication link 150. The communication link 150 may be a Bluetooth link, a Wi-Fi link, or any other type of wireless communication or connection. Accordingly, the mobile device 110 or the wearable device 140 may establish the communication link 150 with the wearable device 140 or mobile device 110, respectively. In some examples, the collocation manager 120 may establish the communication link 150 or instruct the mobile device 110 or wearable device 140 to establish the communication link 150. Accordingly, the communication link 150 allows the mobile device 110 and wearable device 140 to communicate with one another. For example, the mobile device 110 and wearable device 140 may exchange status data, text data, communication data, etc. using any suitable techniques. In examples disclosed herein, the mobile device 110 and the wearable device 140 send or receive movement data to one another via the communication link 150.

Figure 2:
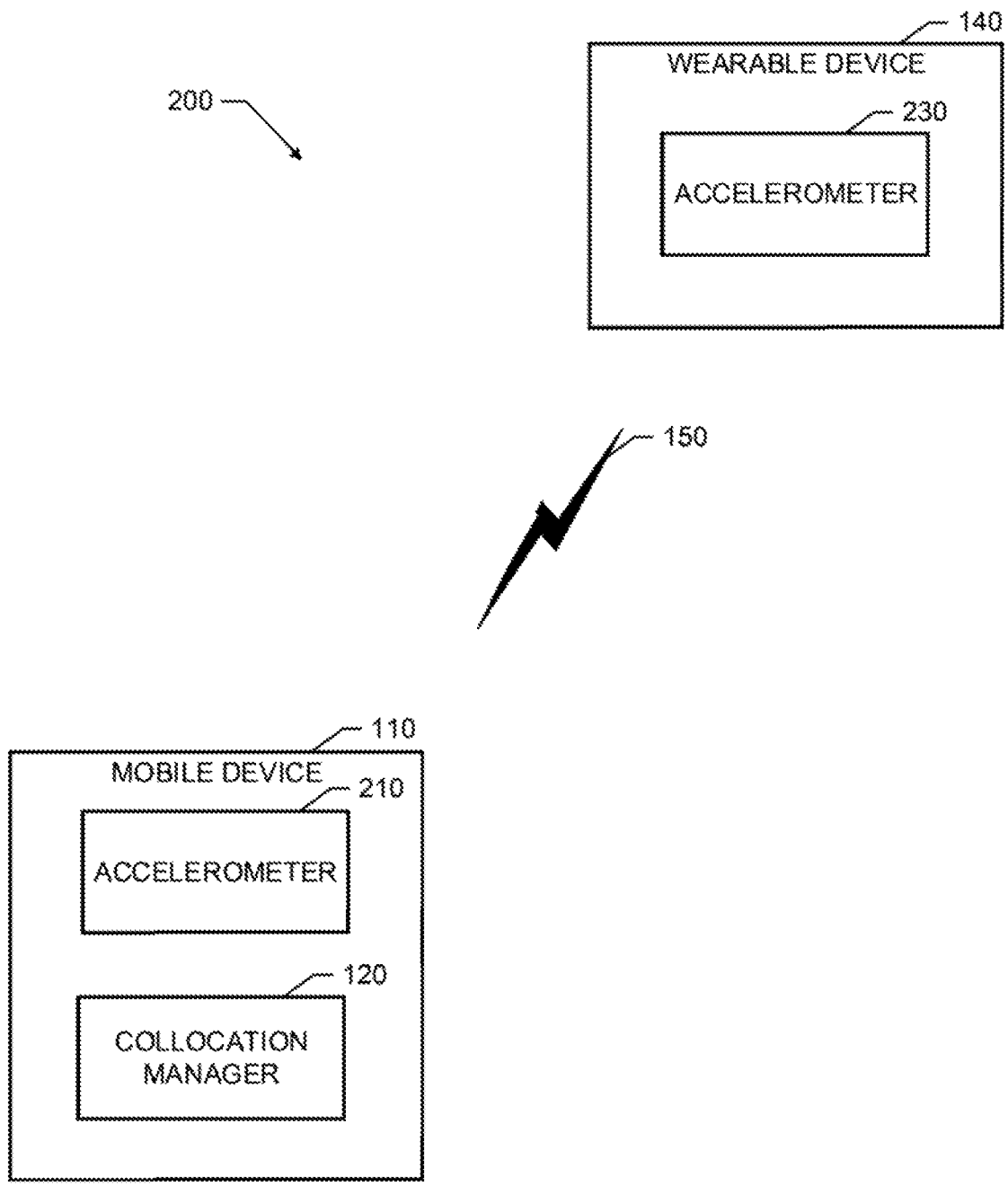
FIG. 2 is a schematic illustration of a system for implementing the collocation manager of FIG. 1.

FIG. 2 is a schematic illustration of a system 200 for implementing the collocation manager 120 of FIG. 1. In the example system 200 of FIG. 2, a mobile device 110, which may be used to implement the mobile device 110 of FIG. 1, communicates with a wearable device 140, which may be used to implement the wearable device 140 of FIG. 1. The example mobile device 110 and the wearable device 140 of FIG. 2 may communicate via the communication link 150, which may be used to implement the communication link 150 of FIG. 1.

In the illustrated example of FIG. 2, the mobile device 110 includes a first accelerometer 210 and a collocation manager 120, which may be used to implement the collocation manager 120 of FIG. 2. In FIG. 2, the wearable device 140 includes a second accelerometer 240. Additionally or alternatively, the wearable device 140 of FIG. 2 may include a collocation manager having the same or similar functionality as the collocation manager 120 or the collocation manager 120.

The example first and second accelerometers 210, 240 of FIG. 2 measure movement of the mobile device 110 and the wearable device 140, respectively. The example accelerometers 210, 240 may be implemented by any suitable type of accelerometer (e.g., gyroscopic sensor, three-dimensional accelerometer, etc.) for measuring movement of a user (e.g., the user 101 of FIG. 1). Accordingly, the mobile device 110 and the wearable device 140 may instruct (e.g., via processors of the respective devices) the accelerometers 210, 240 to measure movement of the corresponding devices 110, 140 and provide the corresponding devices 110, 140 or the collocation manager 120 with movement data including information representative of respective measured movement. The collocation manager 120 in the illustrated example of FIG. 2 analyzes the movement data from the first accelerometer 210 and movement data from the second accelerometer 240 of the wearable device 140 received via the communication link 150 in accordance with the teachings of this disclosure.

Figure 3:
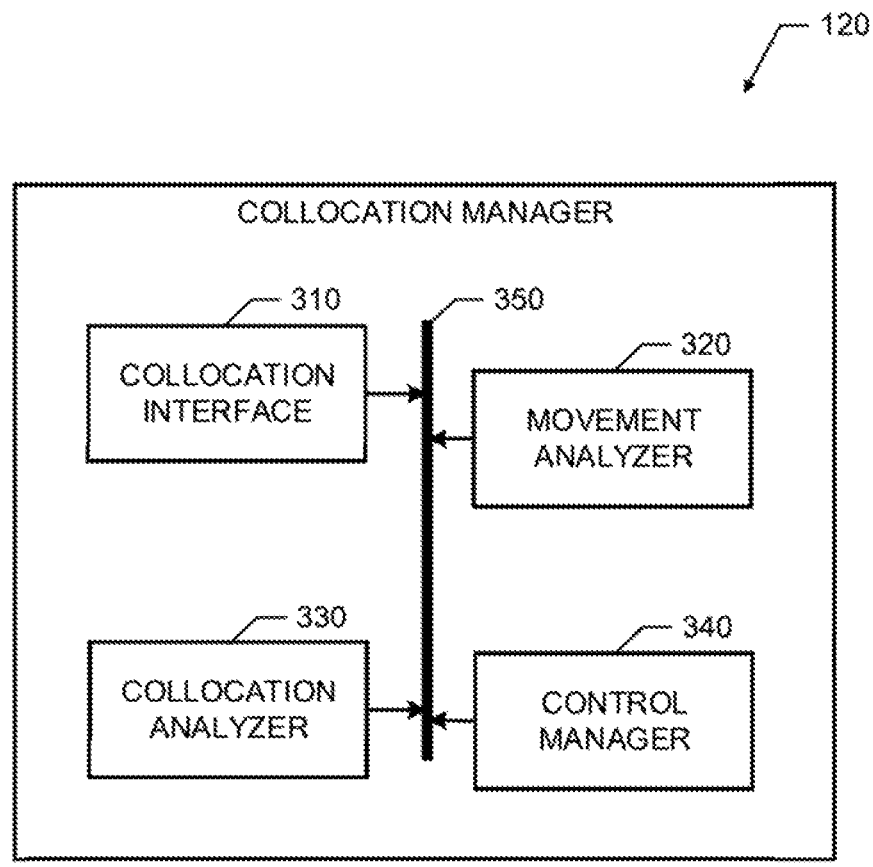
FIG. 3 is a block diagram of an example collocation manager that may be used to implement the collocation manager of FIG. 1 or 2 in accordance an aspect of this disclosure.

FIG. 3 is a block diagram of an example collocation manager 120 that may be used to implement the collocation manager 120 of FIG. 1 or 2. The collocation manager 120 in the illustrated example of FIG. 3 includes a movement data retriever 310, a movement analyzer 320, a collocation analyzer 330, and a control manager 340. The example movement data retriever 310, the movement analyzer 320, the collocation analyzer 330, and the control manager 340 communicate via a communication bus 350.

The example collocation interface 310 may identify a communication link (e.g., the communication link 150) established between a first device and a second device. For the sake of the examples disclosed herein, the mobile device 110 of FIG. 1 or 2 may be considered the first device and the wearable device 140 of FIG. 1 or 2 may be considered the second device, other example types of devices may be used. In some examples, the collocation interface 310 may request, instruct, or cause the mobile device 110 or the wearable device 140 to establish the communication link 150 with one another. The example collocation interface 310 may receive or retrieve movement data from the mobile device 110 or the wearable device 140. For example, the collocation interface 310 may retrieve movement data from the first accelerometer 210 of FIG. 2 from the mobile device 110 and receive (via the communication link 150) movement data measured by the second accelerometer 230 from the wearable device 140. The collocation interface 310 may forward movement data retrieved or received from accelerometers of devices (e.g., the mobile device 110, the wearable device 140, or any other device of a user) to the movement analyzer 320 of FIG. 3. The example collocation interface 310 may receive or retrieve data packets (e.g., Bluetooth low-energy (BLE) data packets) including the movement data. In some examples, such data packets are transmitted in each communication event (e.g., transmitting events, receiving events, status messages, etc.) between the mobile device 110 and the wearable device 140. In some examples, the data packets are transmitted periodically (e.g., every second, every five seconds, etc.) or aperiodically (e.g., in response to a trigger, such as detecting a footstep of a user wearing a device or not detecting a footstep of a user after a period of time).

The example movement analyzer 320 of FIG. 3 analyzes movement data measured by the accelerometers 210, 240 of the devices 110, 140. The example movement analyzer 320 may identify a pattern in the movement data, such as a footstep pattern from measurement data indicating that the user 101 has taken a step or multiple steps. For example, a footstep may be identified when an accelerometer (e.g., the first and second accelerometers 210, 240) measures a magnitude of acceleration (e.g., or a magnitude of an average of acceleration across a designated period of time) greater than 0.5 g (or any other suitable value). In some examples, to filter potential noise, a windowed average of the magnitude may be used across a plurality of accelerometer measurements from the first and second accelerometers 210, 240.

The movement analyzer 320 of FIG. 3 may analyze movement data from a plurality of data packets received via the communication link 150. For example, the movement analyzer 320 may use a designated number of data packets (e.g., eight, sixteen, etc.) including movement data to determine a footstep pattern of the user 101 of FIG. 1. In some examples, the movement analyzer 320 may use a sliding window of received data packets including movement data to determine or measure a pattern of movement of the devices.

In some examples, the movement analyzer 320 may detect a change in mobility status of the devices 110, 140. For example, the movement analyzer 320 may determine when the mobile device 110 or the wearable device 140 starts or stops moving (e.g., based on the whether footsteps are or are not detected for a period of time).

Figure 4:
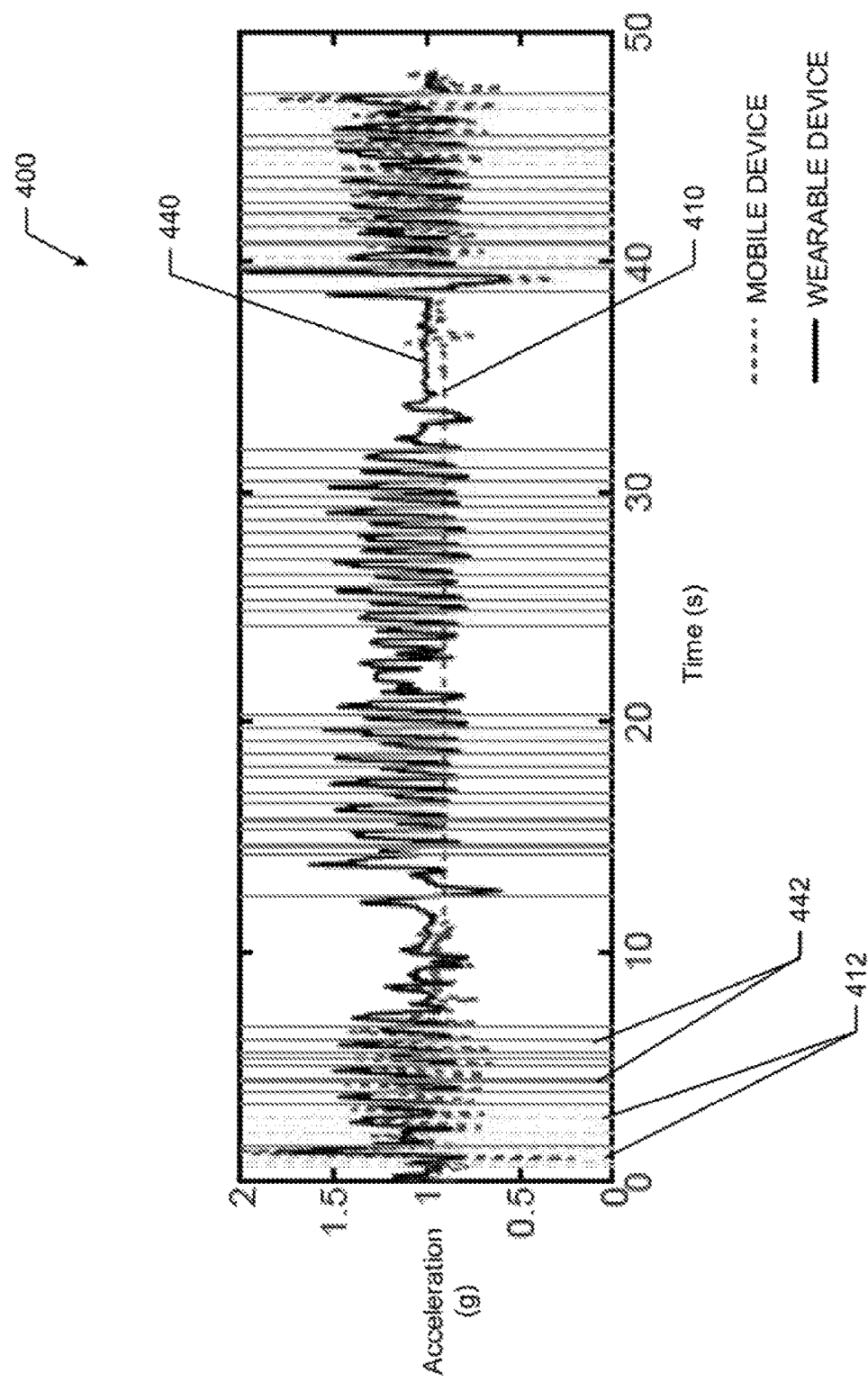
FIG. 4 is a chart 400 representative of an analysis/comparison of movement data of a first device and second device to be analyzed by the collocation manager of FIG. 1, 2, or 3 in accordance with an aspect of this disclosure.

The example collocation analyzer 330 of FIG. 3 compares movement data or identified movement patterns from at least two devices (e.g., the mobile device 110 and the wearable device 140) detected by the movement analyzer 320 to determine whether the devices are collocated on a same person (e.g., the user 101). The collocation analyzer 330 determines whether movement data (e.g., data representative of a movement pattern, data representative of a footstep pattern, etc.) of the wearable device 140 matches or substantially matches (e.g., within a designated threshold accuracy or percentage, such as 75%, 90%, etc.) a movement pattern of the mobile device 110. For example, as described below, FIG. 4 is a chart 400 representative of an analysis/comparison of movement data from the mobile device 110 and the wearable device 140. The collocation analyzer 330 may then indicate to the control manager 340 whether the mobile device 110 and the wearable device 140 are collocated on the user 101 to facilitate control of the mobile device 110 or the wearable device 140. In some examples, the collocation analyzer 330 may indicate a change in a collocation status (e.g., no longer collocated, now collocated, etc.) of the mobile device 110 or the wearable device 140.

In some examples, the collocation analyzer 330 of FIG. 1 includes a timer and/or a timestamp identifier to synchronize received movement data. For example, the collocation analyzer 330 may synchronize movement data received from the mobile device 110 and the wearable device 140 based on timestamps corresponding to when the respective movement data was measured. Accordingly, the movement data for the devices 110, 140 may be synchronized for analysis by the collocation analyzer 330 to determine whether the devices 110, 140 are collocated an the user 101. Furthermore, a sliding window used to measure or identify a footstep pattern may also be synchronized by the collocation analyzer 330.

The example control manager 340 of FIG. 3 manages control of function(s) of the mobile device 110 or control of function(s) of the wearable device 140 based on whether the mobile device 110 and the wearable device 140 are determined to be collocated on the user 101. The example control manager 340 may send instructions to a processor of the mobile device 110 and/or a processor of the wearable device 140 (e.g., via the communication link 150 in the examples of FIGS. 1 and 2) to control the mobile device 110 or the wearable device 140 respectively. The example collocation manager 340 may manage control settings based on instructions from a user (e.g., instructions received via an input/output device of the mobile device 110 or the wearable device 140) or default settings of the devices 110, 140. In some examples, the control manager 340 may control the devices 110, 140 by activating automated messaging, alerting a user, or locking the mobile device 110 or the wearable device 140.

In some examples, when the collocation analyzer 330 indicates that the mobile device 110 and the wearable device 140 are not collocated on the user, the control manager 340 may instruct a notification mechanism of the mobile device 110 or the wearable device 140 to alert the user 101. For example, an alarm or notifier (e.g., a light emitter, ringer, display, etc.) may indicate that the mobile device 110 or the wearable device 140 are not located on the user 101. In some examples, the collocation analyzer 330 or the movement analyzer 320 may indicate a mobility status of the devices 110, 140 (e.g., moving, not moving, etc.). Based on the mobility status, the control manager 340 may make a determination as to whether the mobile device 110 or the wearable device 140 is to notify the user 101. For example, if the mobile device 110 is not moving and the wearable device 140 is moving, the alert may be sent to the user 101 via the wearable device (because it is assumed that the wearable device is still with the user 101 as the wearable device 140 is moving (e.g., detecting footsteps) and the mobile device 110 is not).

In some examples, when the collocation analyzer 330 indicates that the mobile device 110 and the wearable device 140 are not collocated on the user 101, the control manager 340 may control a message response system of the mobile device 110 to enter an auto-reply mode. In auto-reply mode, the example mobile device 110 may automatically send reply messages when the mobile device receives a text message, email, or phone call from another device. For example, such an automatically sent reply message may indicate that the mobile device 110 (or the wearable device 140) is not located on the user 101. For example, an automatic reply message (e.g., a text message, an email, etc.) may state "I do not have my mobile device with me, but will contact you when I receive your message." Furthermore, when the collocation analyzer 330 determines that the mobile device 110 and the wearable device 140 are collocated on the user 101, the control manager 340 may disable the auto-reply mode, and the mobile device 110 and wearable device 140 may return to a previous setting.

In some examples, when the collocation analyzer 330 indicates that the mobile device 110 and the wearable device 140 are not collocated on the user 101, the control manager 340 may control a security mechanism of the mobile device 110 or a security mechanism of the wearable device 140 to enter a lock mode. In lock mode, the example mobile device 110 or wearable device 140 may lock respective user interfaces of the mobile device 110 or wearable device 140. The lock mode may require the user 101 or other person to enter a password or pass some other security requirement (e.g., fingerprint recognition, voice recognition, facial recognition, etc.) to unlock the phone. The lock mode may also allow access to only designated functions of the mobile device 110 or the wearable device 140. In some examples, the collocation analyzer 330 and/or the movement analyzer 320 may indicate a mobility status of the devices 110, 140 (e.g., moving, not moving, detecting footsteps of the user 101, not detecting footsteps of the user 101, etc.). Based on the mobility status, the control manager 340 may make a determination as to whether the mobile device 110 or the wearable device 140 is to enter lock mode.

Accordingly, in some examples, if the collocation analyzer 330 determines that the mobile device 110 and the wearable device 140 are not collocated on the user 101, and the mobile device 110 is not moving, the control manager 340 of FIG. 3 may instruct the wearable device 140 (e.g., via BLE packets sent via the communication link 150) to notify the user 101 and instruct (a processor of) the mobile device 110 to enter auto-reply mode and lock mode.

In some examples, the control manager 340 may wait a designated period of time (e.g., a period of time indicated by the user 101) before controlling or sending instructions to control the mobile device 110 or the wearable device 140. For example, an extended period of time (e.g., more than one minute) may be used to allow the user 101 to separate the mobile device 110 or the wearable device 140 from the user 101 without the control manager 340 controlling a function of the mobile device 110 or the wearable device 140. In such an example, the user 101 may have more flexibility leaving the mobile device 110 or wearable device 140 without causing the control manager 340 to take control of the mobile device 110 or the wearable device 140 (e.g., locking the screen, sending auto-reply messages, or sending alert notifications, etc.). Additionally, a shortened period of time may be set when the user 101 does not expect to be separated from the mobile device 110 or the wearable device 140. In such an example, the user 101 may more quickly be notified that the mobile device 110 or the wearable device 140 are not collocated with the user 101 or the mobile device 110 or wearable device 140 may more quickly be locked.

While an example manner of implementing the collocation manager 120 of FIG. 1 or 2 is illustrated in FIG. 3, at least one of the elements, processes and/or devices illustrated in FIG. 3 may be combined, divided, re-arranged, omitted, eliminated and/or implemented in any other way. Further, the collocation interface 310, the movement analyzer 320, the collocation analyzer 330, or the control manager 340, or, more generally, the example collocation manager 120 of FIG. 3 may be implemented by hardware and/or any combination of hardware and executable instructions (e.g., software and/or firmware). Thus, for example, any of the collocation interface 310, the movement analyzer 320, the collocation analyzer 330, or the control manager 340, or, more generally, the example collocation manager 120 could be implemented by at least one of an analog or digital circuit a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the collocation interlace 310, the movement analyzer 320, the collocation analyzer 330, or the control manager 340 is/are hereby expressly defined to include a tangible computer readable storage device or storage disk such as a memory, a digital versatile disk (DVD), a compact disk (CD), a Blu-ray disk, etc. storing the executable instructions. Further still, the example collocation manager 120 of FIG. 3 may include at least one element, process, and/or device in addition to, or instead of, those illustrated in FIG. 3, and/or may include more than one of any or all of the illustrated elements, processes and devices.

FIG. 4 is a chart 400 representative of an analysis/comparison of movement data of a first device (e.g., the mobile device 110) and second device (e.g., the wearable device 140) to be analyzed by the collocation manager 120 of FIG. 1, 2, or 3 in accordance with an aspect of this disclosure. In FIG. 4, a first set of movement data points 410 are charted for the mobile device 110 and a second set of movement data points 440 are charted for the wearable device 140. The movement data points 410, 440 indicate accelerometer readings (g) taken over a fifty (50) second time period. As indicated by the movement data points 410, the mobile device 110 was moving (e.g., located with a user) between 0 and about 12 seconds and between about 30 and about 48 seconds. Furthermore, as indicated by the movement data points 440, the wearable device 140 was moving between 0 and about 48 seconds.

In the illustrated example of FIG. 4, footstep markers 412 (represented by vertical dotted lines) indicate each point in time that the user 101 took a step as measured by the accelerometer of the mobile device 110 and footstep markers 442 (represented by vertical solid lines) indicate each point in time that the user 101 took a step as measured by the accelerometer of the wearable device 140. In some examples, the 50 second time period may include fifty (50) measurement readings received in fifty (50) data packets from each of the first accelerometer 210 or second accelerometer 240 of FIG. 2. Accordingly, the collocation manager 120, in accordance with the teachings of this disclosure may determine that the mobile device 110 was collocated with the wearable device 140 between about 0 and 12 seconds and between about 30 and 48 seconds (as the footstep patterns indicated by the markers 412, 414 substantially match during those time periods).

Flowcharts and a state diagram representative of example machine readable instructions for implementing the collocation manager 120 of FIG. 3 are shown in FIG. 5, 8, 7, 8, or 9. In this example, the machine readable instructions comprise a program/process for execution by a processor such as the processor 1012 shown in the example processor platform 1000 discussed below in connection with FIG. 10. The program/process may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 1012, but the entire program/process and/or parts thereof could alternatively be executed by a device other than the processor 1012 and/or embodied in firmware or dedicated hardware. Further, although the example program is described with reference to the flowchart illustrated in FIG. F, many other methods of implementing the example collocation manager 120 may alternatively be used. For example, the order of execution of the blocks may be changed, and/or some of the blocks described may be changed, eliminated, or combined.

Figure 5:
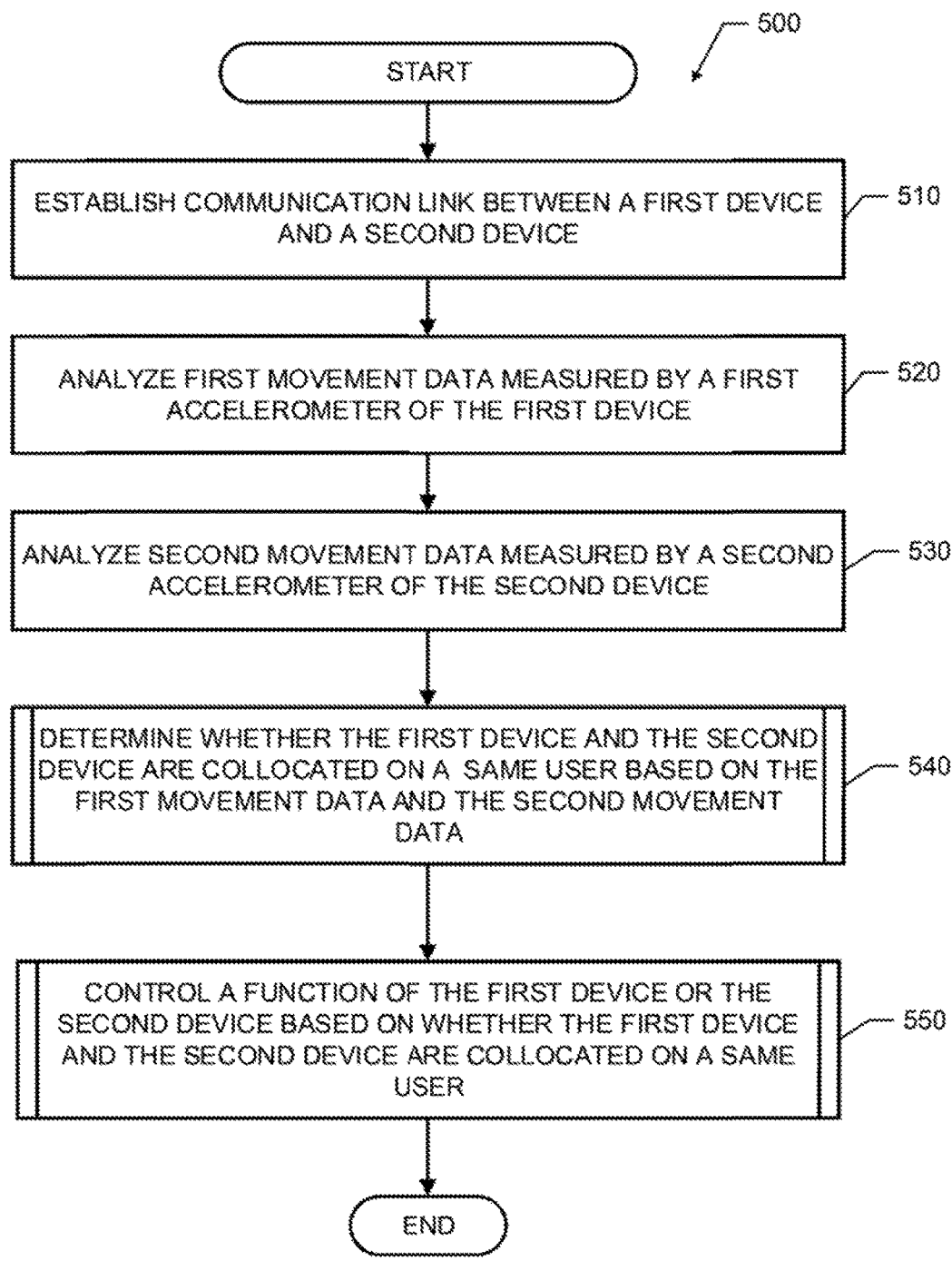
FIG. 5 is a flowchart representative of example machine readable instructions that may be executed to implement the collocation manager of FIG. 3 in accordance with an aspect of this disclosure.

The process 500 of FIG. 5 begins with an initiation of the collocation manager 120 (e.g., upon startup, upon instructions from a user, upon startup of a device (e.g., the mobile device 110 or the wearable device 140) implementing the collocation manager 120, etc.). At block 510, the collocation interface 310, the mobile device 110, or the wearable device 140 establishes a communication link 150 (e.g., a Bluetooth connection, a Wi-Fi connection, etc.) between a first device (e.g., the mobile device 110) and a second device (e.g., the wearable device 140). In some examples, the collocation interface 310 instructs the mobile device 110 to establish the communication link 150 with the wearable device 140 (e.g., in response to starting up the collocation manager 120). Any suitable method or technique for establishing the communication link 150 may be used.

At block 520, the movement analyzer 320 analyzes first movement data measured by a first accelerometer of the mobile device 110 and, at block 530, the movement analyzer 320 analyzes second movement data measured by a second accelerometer of the wearable device 140. At block 540, the collocation analyzer 330 determines whether the mobile device 110 and the wearable device 140 are collocated on the user 101 based on the first movement data and the second movement data. At block 550, the control manager 340 controls a function of the mobile device 110 or the wearable device 140 based on whether the mobile device 110 and the wearable device are collocated on the user 101. In some examples, the function includes setting an auto-reply mode, setting a lock mode, or alerting a user. After block 550, the process 500 ends.

Figure 6:
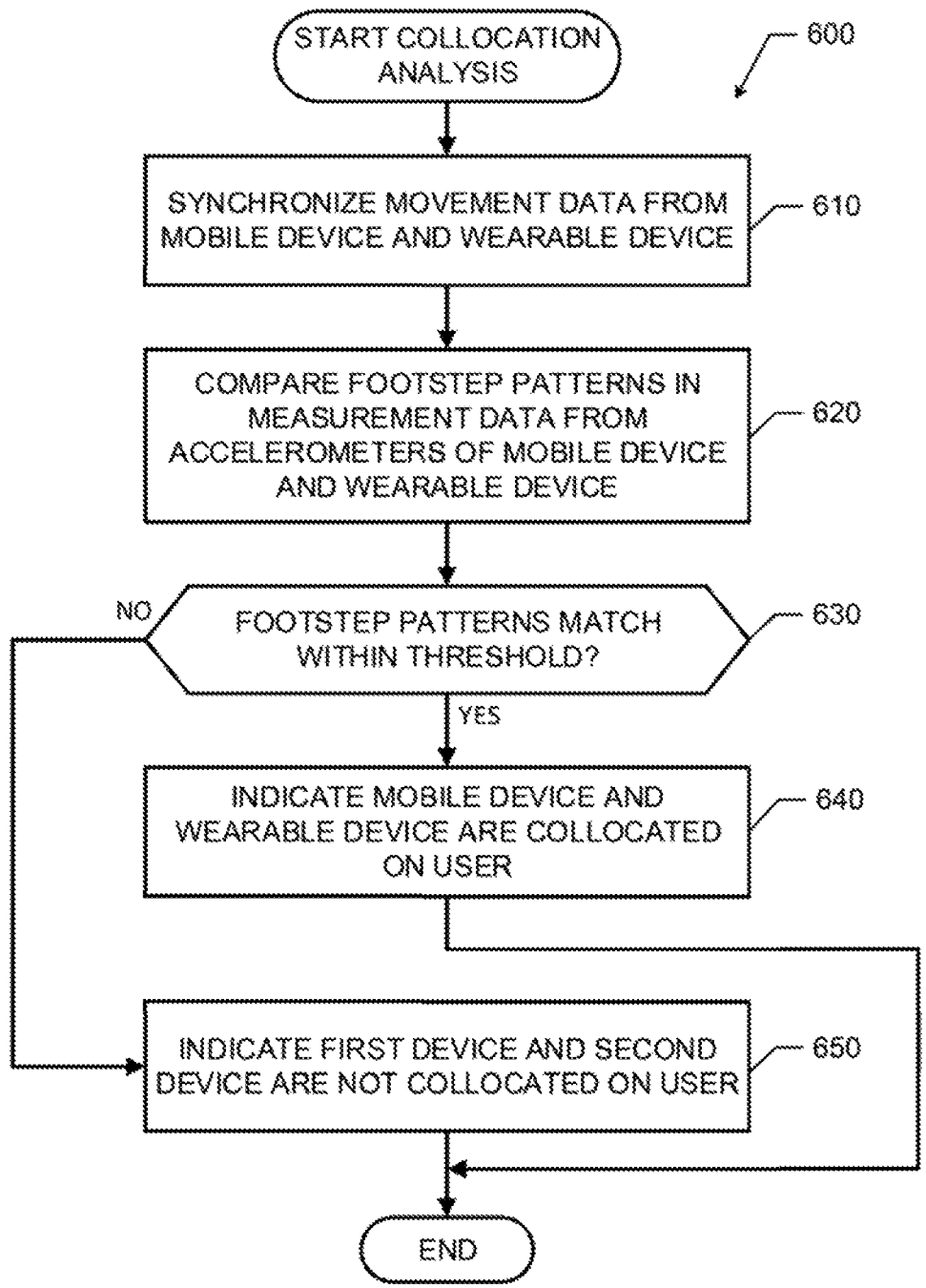
FIG. 6 is a flowchart representative of an example portion of the example machine readable instructions of FIG. 5 to implement the collocation manager of FIG. 3 in accordance with an aspect of this disclosure.

The process 600 of FIG. 6 begins with an initiation of the collocation analyzer 330 of FIG. 3 (e.g. upon startup of the collocation manager 120, upon receipt of movement data from the movement analyzer 320, etc.). The example process 800 of FIG. 6 may be executed to implement block 540 of FIG. 5. At block 610, the collocation analyzer 330 synchronizes movement data from the mobile device 110 and the wearable device 140. For example, the collocation analyzer 330, at block 610, may identify and use timestamps corresponding to respective movement data to synchronize the movement data such that a same window or time period of the movement data is measured and compared. At block 620 of FIG. 6, the collocation analyzer 330 compares footstep patterns in measurement data from accelerometers of the mobile device 110 and the wearable device 140.

At block 630, the collocation analyzer 330 determines whether the footstep patterns match within a threshold. For example, at block 630, the collocation analyzer 330 determines whether a threshold percentage (e.g., 75%, 90%, etc.) of measured footsteps match one another. If, at block 630, the collocation analyzer 330 determines that the footstep patterns do match one another within the threshold, the collocation analyzer 330 may indicate (to the control manager 340) that the mobile device 110 and the wearable device 140 are collocated on a (same) user (block 640). If, at block 630, the collocation analyzer 330 determines that the footstep patterns do not match one another within the threshold, the collocation analyzer 330 indicates (to the control manager 340) that the mobile device 110 and the wearable device 140 are not collocated on the (same) user (block 650). After blocks 640 and 650, the process 600 ends.

Figure 7:
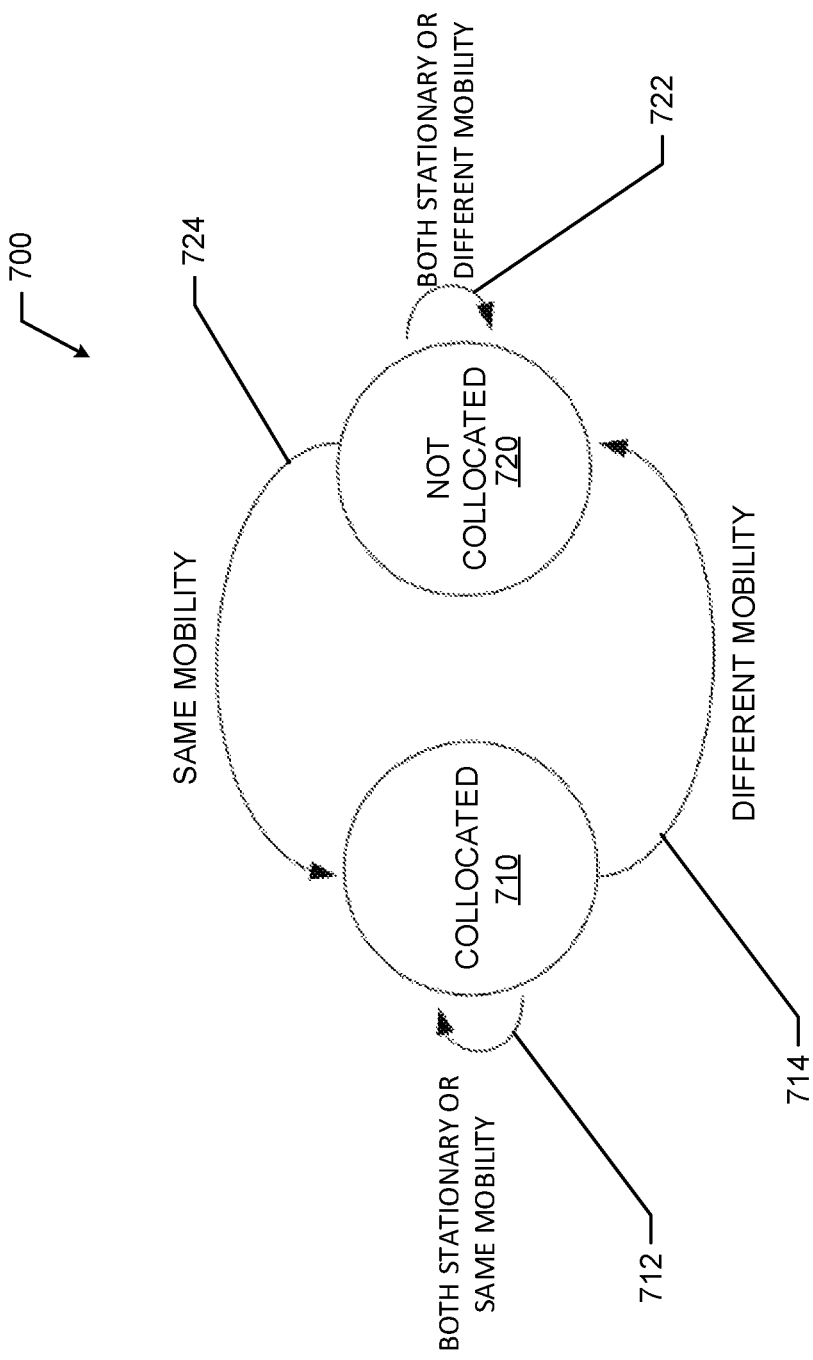
FIG. 7 is a state diagram representative of example machine readable instructions of FIG. 5 that may be executed additionally or alternatively to the example machine readable instructions of FIG. 6 to implement the collocation manager of FIG. 3 in accordance with an aspect of this disclosure.

FIG. 7 is a state diagram representative of example machine readable instructions that may be executed to implement the block 540 of FIG. 1. In some examples, the collocation analyzer 330 may continuously monitor the movement data to determine the current state of collocation of the mobile device 110 and the wearable device 140. At state 710, the mobile device 110 and the wearable device 140 are determined to be collocated by the collocation analyzer 330. At event 712, the collocation analyzer 330 determines that both the mobile device 110 and the wearable device 140 are either both stationary or have the same mobility (e.g., the movement data of the mobile device 110 matches the movement data of the wearable device 140 in accordance with this disclosure). After event 712, the collocation analyzer 330 indicates to the control manager 340 that the mobile device 110 and the wearable device 140 are collocated on the user 101 (state 710). At event 714, the collocation analyzer 330 detects different mobility between the mobile device 110 and the wearable device 120 (e.g., one device is moving, the other is not) based on movement data received from the mobile device 110 and the wearable device 140. After event 714, the collocation analyzer 330 determines that the mobile device 110 and the wearable device 140 are not collocated (state 720) and the collocation analyzer 330 indicates to the control manager 340 that the mobile device 110 and the wearable device 140 are not collocated.

At state 720, the mobile device 110 and the wearable device 140 are determined to not be collocated (i.e., they are separated) by the collocation analyzer 330. At event 722, the collocation analyzer 330 determines that both the mobile device 110 and the wearable device 140 are either both stationary or have different mobility (e.g., the movement data of the mobile device 110 does not match the movement data of the wearable device 140 in accordance with this disclosure). After event 722, the collocation analyzer 330 indicates to the control manager 340 that the mobile device 110 and the wearable device 140 are not collocated on the user 101 (state 720). At event 724, the collocation analyzer 330 detects same mobility between the mobile device 110 and the wearable device 120 (e.g., both are moving and have a matching footstep pattern) based on movement data received from the mobile device 110 and the wearable device 140. After event 724, the collocation analyzer 330 determines that the mobile device 110 and the wearable device 140 are collocated (state 710) and the collocation analyzer 330 indicates to the control manager 340 that the mobile device 110 and the wearable device 140 are collocated.

Figure 8:
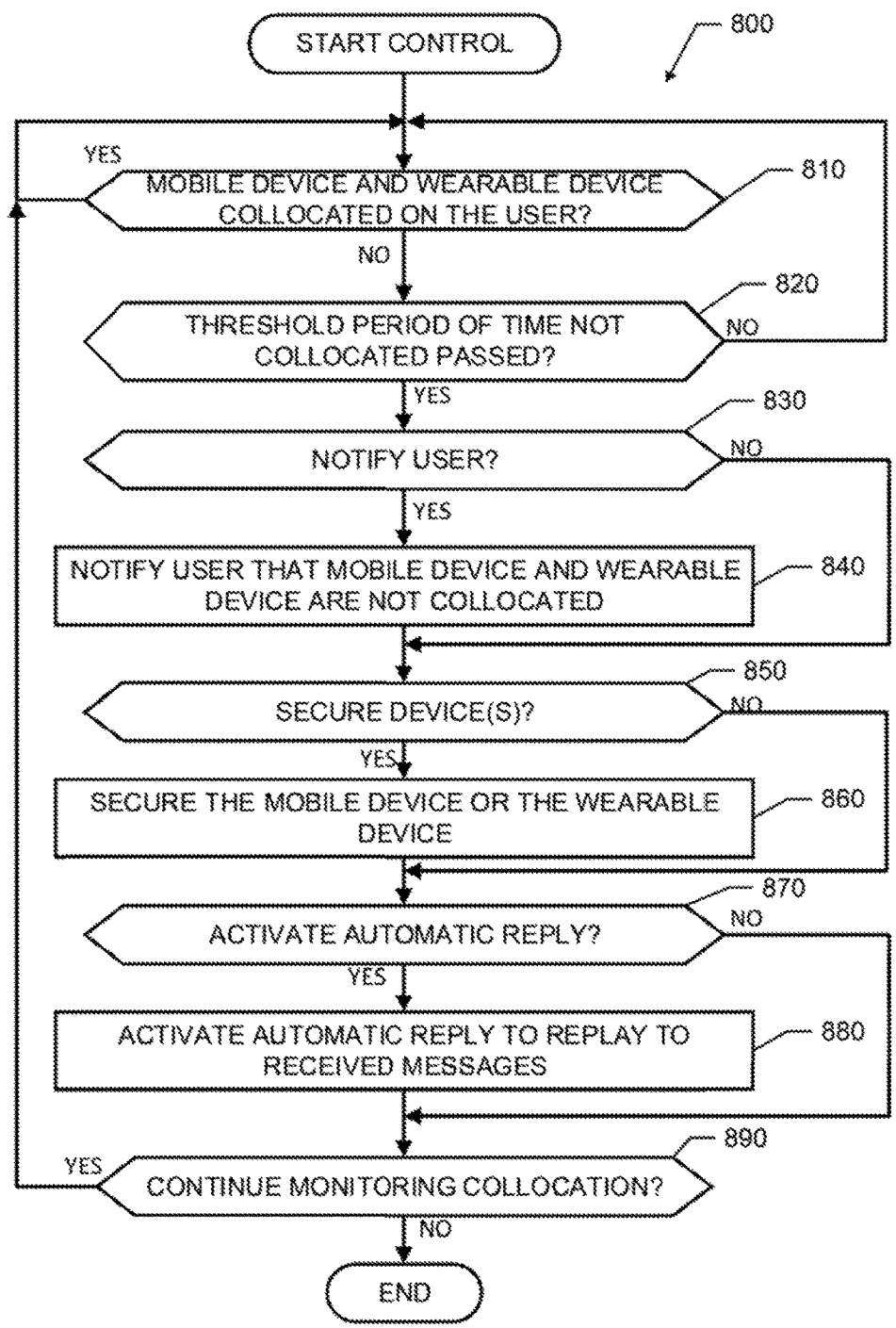
FIG. 8 is a flowchart representative of another example portion of the example machine readable instruction of FIG. 5 to implement the collocation manager of FIG. 3 in accordance with an aspect of this disclosure.

The process 800 in the illustrated example of FIG. 8 begins with an initiation of the collocation analyzer 340 of FIG. 3 (e.g. upon startup of the collocation manager 120, upon receipt of collocation status from the collocation analyzer 330, etc.). The example process 800 of FIG. 8 may be executed to implement block 550 of FIG. 5. At block 810, the control manager 340 determines whether the mobile device 110 and the wearable device are collocated on the user 101 based on information from the collocation analyzer 330. If the mobile device 110 and the wearable device 140 are collocated on the user 101, then control returns to block 610. In such examples, control of the mobile device 110 and the wearable device 140 may remain the same based on previously established settings for the devices 110, 140 when they are collocated. If, at block 810, the control manager 340 determines that the mobile device 110 and the wearable device 140 are not collocated, then the mobile device 110 determines whether a threshold period of time not collocated (e.g., 10 seconds, 30 seconds, 1 minute, etc.) has passed that the mobile device 110 and the wearable device 140. If the threshold period of time has not passed (block 820), control returns to block 810 to determine whether the mobile device 110 and wearable device 140 are collocated.

If, at block 820, the threshold period of time has passed, the control manager 340 determines whether to notify the user 101 that the mobile device 110 and the wearable device 140 are not collocated on the user 101 (e.g., based on notification settings established by the user). If the user 101 is not to be notified, control advances to block 850. If the user 101 is to be notified (block 830), then the control manager 340, at block 840, controls or instructs the mobile device 110 or the wearable device 140 (e.g., based on settings, based on which device is not located with the user, etc.) to notify the user via a notification mechanism (e.g., an alarm, a display, a light emitter, a vibration mechanism, etc.).

At block 850 of FIG. 8, the control manager 340 determines whether to secure the mobile device 110 or the wearable device 140 (e.g., based on user settings or instructions). If, at block 850, the device(s) 110, 140 are not to be secured, control advances to block 870. If, at block 870, the control manager 340 determines that the device(s) 110, 140 are to be secured, the control manager 340 controls or instructs the mobile device 110 or the wearable device 140 to activate a security mechanism (e.g., a passcode, a fingerprint scanner, a face recognition device, etc.). The control manager 340 may determine which of the devices 110, 140 are to be secured based on which device(s) is/are collocated with the user 101, user settings or instructions, etc.

At block 870 of FIG. 8, the control manager 340 determines whether to active automatic reply (e.g., based on user settings or instructions). If the control manager 340 is not to activate automatic reply, control advances to block 890. If, at block 870, the control manager 110 may instruct the mobile device 110 (or the wearable device 140) to activate a message reply system to automatically reply to any message (e.g., text, call, voicemail, email, etc.) received from another device.

Figure 9:
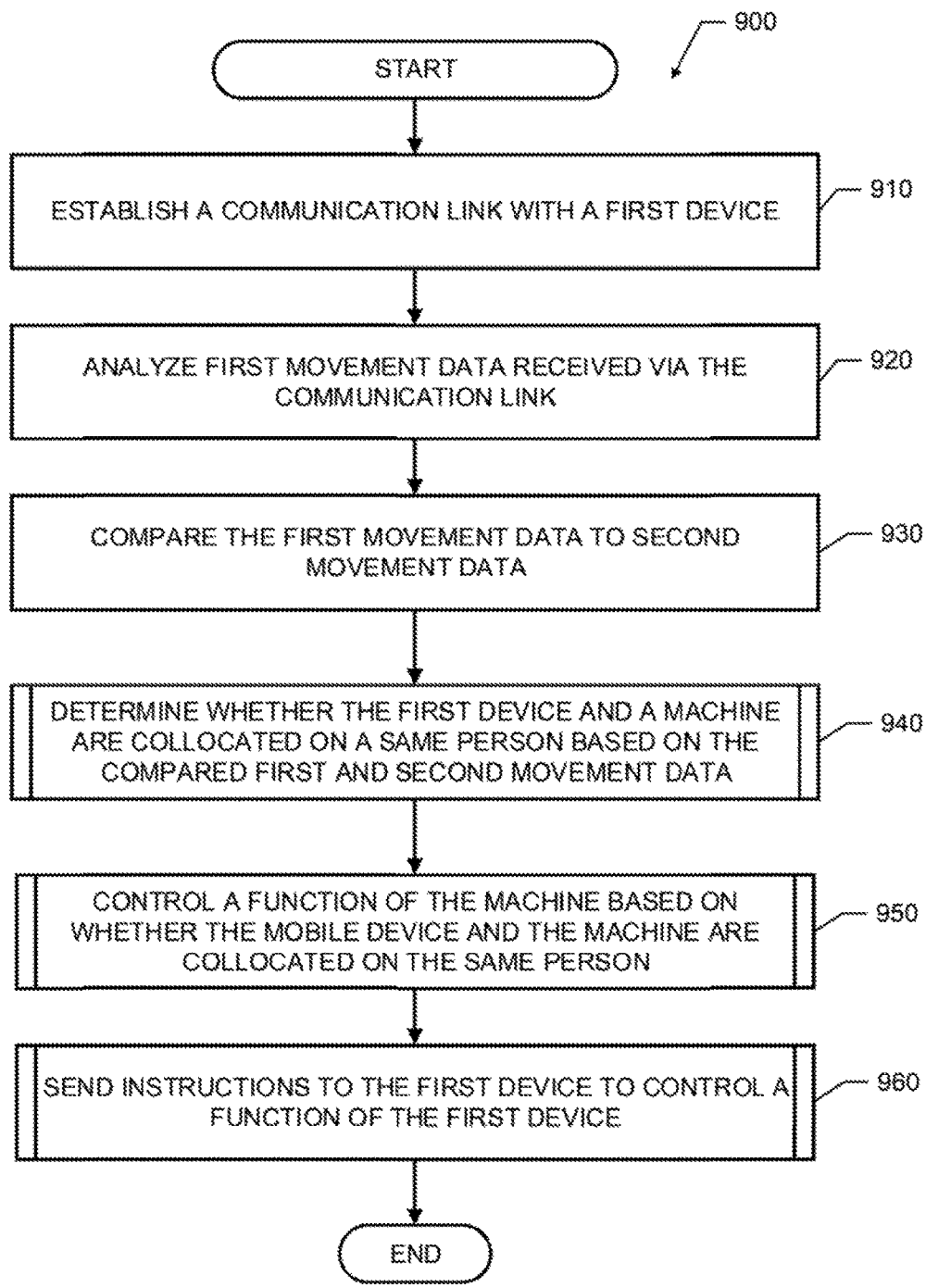
FIG. 9 is a flowchart representative of other example machine readable instructions that may be executed to implement the collocation manager of FIG. 3 in accordance with an aspect of this disclosure.

At block 890 of FIG. 9, the collocation manager 120 determines whether to continue monitoring collocation of the mobile device 110 and the wearable device 140 on the user 101. If the collocation manager 120 is to continue monitoring the collocation status of the mobile device 110 and the wearable device 140, control returns to block 810. If the collocation manager 120 is not to continue monitoring collocation of the mobile device 110 and the wearable device 140 (e.g., due to a system failure or error, due to shutdown, due to user instructions, due to an end or disconnection of the communication link 150, etc.), then the process 800 ends.

The process 900 of FIG. 9 begins with an initiation of the collocation manager 120 (e.g., upon startup, upon instructions from a user, upon startup of a device (e.g., the mobile device 110) implementing the collocation manager 120, etc.). At block 910, the collocation interface 310 establishes a communication link (e.g., a Bluetooth connection, a Wi-Fi connection, etc.) with a first device (e.g., the wearable device 140 of FIG. 2). At block 920, the movement analyzer 320 analyzes first movement data received (e.g., from the wearable device 140) via the communication link. At block 930, the collocation manager 330 compares the first movement data to second movement data (e.g., from an accelerometer of the mobile device 110), and, at block 940, the collocation manager 940 determines whether the wearable device 140 and the mobile device 110 are collocated on the user 101 based on the compared first and second movement data. In some examples, blocks 930 and 940 may be implemented by executing the process 600 of FIG. 6.

At block 950 of FIG. 9, the control manager 340 controls a function of the mobile device 110 based on whether the wearable device 140 and the mobile device 110 are collocated on the user 101. At block 960, the control manager 340 sends instructions to the wearable device 140 to control a function of the wearable device 140. In some examples, blocks 950 and 960 may be implemented by executing the process 600 of FIG. 6. After block 960, the process 900 ends.

As mentioned above, the example processes of FIG. 5, 6, 7, 8, or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 5, 6, 7, 8, or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, the term "or," unless otherwise indicated, is not considered an "exclusive or."

Figure 10:
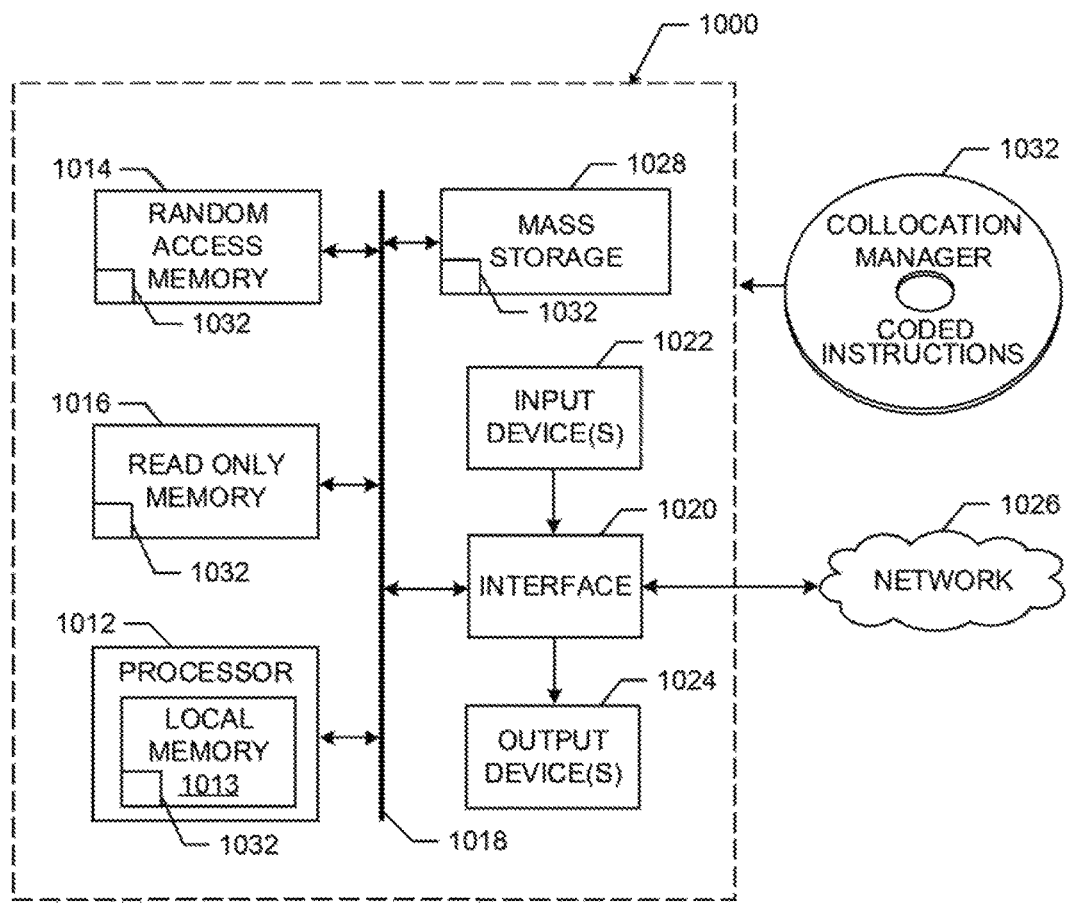
FIG. 10 is a block diagram of an example processor platform capable of executing the instructions of FIG. 5, 6, 7, 8, or 9 to implement the collocation manager of FIG. 3 in accordance with an aspect of this disclosure.

FIG. 10 is a block diagram of an example processor platform 1000 capable of executing the instructions of FIG. 5, 6, 7, 8, or 9 to implement the collocation manager 120 of FIG. 3. The example processor platform 1000 may be or may be included in any type of apparatus, such as, a personal computer, a mobile device (e.g., a cell phone, a smart phone, a tablet, etc.), smart wearable device (e.g., a smartwatch, smart bracelet, etc.), an Internet appliance, a personal gaming console, a personal video recorder or camera, or any other type of computing device.

The processor platform 1000 of the illustrated example of FIG. 10 includes a processor 1012. The processor 1012 of the illustrated example is hardware. For example, the processor 1012 can be implemented by at least one integrated circuit, logic circuit, microprocessor or controller from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit

1020 may be implemented by any type of interface standard, such as an Ethernet interface, a universal serial bus (USB), and/or a peripheral component interconnect (PCI) express interface.

In the illustrated example, at least one input device 1022 is connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 1024 is also connected to the interface circuit 1020 of the illustrated example. The output device(s) 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), or speakers. The interface circuit 1020 of the illustrated example, thus, may include a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, a Wi-Fi connection, a Bluetooth connection, etc.).

The processor platform 1000 of the illustrated example also includes at least one mass storage device 1028 for storing executable instructions (e.g., software) and/or data. Examples of such mass storage device(s) 1028 include floppy disk drives, hard drive disks, compact disk drives, Blu-ray disk drives, RAID systems, secure digital (SD) card drives, and digital versatile disk (DVD) drives.

The coded instructions 1032 of FIG. 5, 6, 7, 8, or 9 may be stored in the mass storage device 1028, in the local memory 1013 in the volatile memory 1014, in the non-volatile memory 1016, and/or on a removable tangible computer readable storage medium such as a CD, DVD, SD card, flash drive, etc.

From the foregoing, it will be appreciated that the above disclosed methods, apparatus, and articles of manufacture determine whether multiple devices are collocated on a same user and control at least one of the multiple device(s) based on the determination. Accordingly, examples disclosed herein allow for safety and security of mobile devices by detecting when at least one device is no longer collocated with a user and notifying the user, locking the device, or sending automatic replies to indicate that the user is no longer located with the device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   establishing a communication link between a first device and a second device;
   analyzing first movement data measured by a first accelerometer of the first device:
   analyzing second movement data measured by a second accelerometer of the second device;
   determining, based on the first movement data and the second movement data, a mobility status of the first device and the second device;
   determining whether the first device and the second device are collocated on a same user based on a change in the mobility status of at least one of the first device or the second device; and
   controlling a function of the first device or a function of the second device based on whether the first device and the second device are collocated on the same user.

2. The method of claim 1, further comprising:
   analyzing the first movement data by measuring a first footstep pattern in the first movement data;
   analyzing the second movement data by measuring a second footstep pattern in the second movement data, the first footstep pattern and the second footstep pattern measured during a designated period of time; and
   determining whether the first device and the second device are collocated on the same user by comparing the first footstep pattern and the second footstep pattern during the designated period of time.

3. The method of claim 2, wherein the designated period of time corresponds to a length of time to receive a designated number of messages comprising the first movement data or the second movement data, the designated number of messages received via the communication link.

4. The method of claim 1, further comprising:
   determining that the first device and the second device are collocated on the same person;
   detecting a change in a first mobility status of the first device based on the first movement data without detecting a change in a second mobility status of the second device based on the second movement data; and
   after detecting the change in the first mobility status, determining that the first device and the second device are not collocated on the same person.

5. The method of claim 1, further comprising:
   determining that the first device and the second device are not collocated on the same person;
   analyzing the first movement data and the second movement data in response to detecting a change in a first mobility status of the first device or a second mobility status of the second device.

6. The method of claim 1, wherein the function of the first device comprises a security mechanism of the first device and controlling the function of the first device comprises:
   securing the first device by activating the security mechanism of the first device when the first device and the second device are not collocated on the same person.

7. A non-transitory computer readable storage medium comprising instructions that upon execution cause a first device to:
   establish a communication link between the first device and a second device;
   analyze first movement data measured by a first accelerometer of the first device;
   analyze second movement data measured by a second accelerometer of the second device;
   determine whether the first device and the second device are collocated on a same user based on the first movement data and the second movement data; and
   control a function of the first device or a function of the second device based on whether the first device and the second device are collocated on the same user, wherein the function of the first device comprises a message response system of the first device, and controlling the function of the first device comprises, when the first device and the second device are not collocated on the same person, in response to receiving a communication from a third device, replying via the message response system with an automated message indicating that the first device is not collocated with the second device.

8. The non-transitory computer readable storage medium of claim 7, wherein the instructions upon execution cause the first device to:
 determine a mobility status of the first device and the second device; and
 determine whether the first device and the second device are collocated on the same user based on a change in the mobility status of at least one of the first device or the second device.

9. The non-transitory computer readable storage medium of claim 8, wherein the instructions upon execution cause the first device to:
 determine that the first device and the second device are not collocated on the same user in response to detecting that the mobility status of the first device is different from the mobility status of the second device.

10. The non-transitory computer readable storage medium of claim 8, wherein the instructions upon execution cause the first device to:
 determine that the first device and the second device are collocated on the same user in response to detecting that the mobility status of the first device matches the mobility status of the second device.

11. A non-transitory computer readable storage medium comprising instructions that upon execution cause a first device to:
 establish a communication link between the first device and a second device;
 analyze first movement data measured by a first accelerometer of the first device;
 analyze second movement data measured by a second accelerometer of the second device:
 determine whether the first device and the second device are collocated on a same user based on the first movement data and the second movement data; and
 control a function of the first device or a function of the second device based on whether the first device and the second device are collocated on the same user, wherein the function of the second device comprises a notification mechanism, and controlling the function of the second device comprises notifying the same user via the notification mechanism when the first device and the second device are not collocated on the same user.

12. An apparatus comprising:
 a processor;
 a movement analyzer executable on the processor to compare first movement data measured by a first accelerometer of a first device to second movement data measured by a second accelerometer of a second device that has a communication link with the first device;
 a collocation analyzer executable on the processor to determine whether the first device is collocated with the second device using messages comprising the first movement data and the second movement data, the messages communicated via the communication link;
 a control manager executable on the processor to, based on whether the first device is collocated with the second device, control the first device or send instructions to the second device to control the second device,
 wherein the collocation analyzer is executable on the processor to, after determining that the first device and the second device are collocated:
 detect that a first mobility of the first device is different from a second mobility of the second device; and
 indicate to the control manager that the first device and the second device are not collocated.

13. The apparatus of claim 12, wherein the collocation analyzer is executable on the processor further to:
 send a first notification to the control manager that the first device and the second device are collocated; and
 after sending the first notification to the control manager:
 detect that the first device and the second device are stationary or that the first mobility of the first device matches the second mobility of the second device; and
 send a second notification to the control manager that the first device and the second device are collocated.

14. The apparatus of claim 12, wherein the collocation analyzer is executable on the processor further to:
 determine that the first device and the second device are not collocated; and
 after determining that the first device and the second device are not collocated:
 detect that the first mobility of the first device matches the second mobility of the second device; and
 indicate to the control manager that the first device and the second device are collocated.

15. The apparatus of claim 12, wherein the collocation analyzer is executable on the processor further to:
 determine that the first device and the second device are not collocated;
 send a first notification to the control manager that the first device and the second device are not collocated; and
 after sending the first notification to the control manager:
 detect that the first device and the second device are stationary or that the first mobility of the first device does not match the second mobility of the second device; and
 send a second notification to the control manager that the first device and the second device are not collocated.

16. A non-transitory computer readable storage medium comprising instructions that, when executed, cause a machine to:
 establish a communication link with a first device;
 analyze first movement data received via the communication link, the first movement data measured via a first accelerometer of the first device;
 compare the first movement data to second movement data received from a second accelerometer of the machine;
 determine whether the first device and the machine are collocated on a same person based on the compared first movement data and the second movement data;
 control a function of the machine based on whether the first device and the machine are collocated on the same person;
 send instructions to the first device to control a function of the first device; and
 activate at least one of a message response system of the machine or a security message system of the machine when the first device is not collocated with the second device on the same person.

17. The non-transitory computer readable storage medium of claim 16, wherein the instructions, when executed, further cause the machine to:
 send the instructions to the first device to control the first device to notify the same person that the first device is not collocated with the machine.

* * * * *

UNITED STATES PATENT AND TRADEMARK OFFICE
CERTIFICATE OF CORRECTION

PATENT NO. : 10,331,916 B2
APPLICATION NO. : 15/516463
DATED : June 25, 2019
INVENTOR(S) : Jeremy Gummeson et al.

Page 1 of 1

It is certified that error appears in the above-identified patent and that said Letters Patent is hereby corrected as shown below:

In the Claims

In Column 13, Line 62, Claim 1, delete "device:" and insert -- device; --, therefor.

In Column 14, Line 40, Claim 6, delete "device" and insert -- device, --, therefor.

In Column 15, Line 32, Claim 11, delete "device:" and insert -- device; --, therefor.

Signed and Sealed this
Tenth Day of September, 2019

Andrei Iancu
*Director of the United States Patent and Trademark Office*